US008134534B1

(12) United States Patent
Gettemy

(10) Patent No.: US 8,134,534 B1
(45) Date of Patent: *Mar. 13, 2012

(54) HIGH TRANSPARENCY INTEGRATED ENCLOSURE TOUCH SCREEN ASSEMBLY FOR A PORTABLE HAND HELD DEVICE

(75) Inventor: Shawn R. Gettemy, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 454 days.

This patent is subject to a terminal disclaimer.

(21) Appl. No.: 11/070,689

(22) Filed: Mar. 1, 2005

Related U.S. Application Data

(63) Continuation of application No. 09/863,788, filed on May 22, 2001, now Pat. No. 6,992,659.

(51) Int. Cl.
*G09G 5/00* (2006.01)

(52) U.S. Cl. ............................ 345/173; 345/175; 349/58

(58) Field of Classification Search .......... 345/156–176; 385/12–14; 349/158; 361/681, 729
See application file for complete search history.

(56) References Cited

U.S. PATENT DOCUMENTS

| 4,429,478 A | 2/1984 | Bruce-Sanders |
| 4,659,873 A | 4/1987 | Gibson et al. |
| 5,130,500 A | 7/1992 | Murakami et al. |
| 5,233,502 A * | 8/1993 | Beatty et al. ................... 361/681 |
| 5,357,061 A | 10/1994 | Crutchfield |
| 5,510,813 A | 4/1996 | Makinwa et al. |
| 5,534,888 A | 7/1996 | Lebby et al. |
| 5,554,828 A | 9/1996 | Primm |
| 5,579,036 A | 11/1996 | Yates, IV |
| 5,634,080 A | 5/1997 | Kikinis et al. |
| 5,641,219 A | 6/1997 | Mizobe |
| 5,696,982 A | 12/1997 | Tanigawa et al. |
| 5,764,322 A | 6/1998 | Mamiya et al. |
| 5,785,439 A | 7/1998 | Bowen |
| 5,786,665 A | 7/1998 | Ohtsuki et al. |
| 5,838,309 A | 11/1998 | Robsky et al. |
| 5,854,625 A | 12/1998 | Frisch et al. |
| 5,907,375 A | 5/1999 | Nishikawa et al. |
| 5,949,643 A | 9/1999 | Batio |

(Continued)

FOREIGN PATENT DOCUMENTS

EP 0668569 A2 8/1995

(Continued)

*Primary Examiner* — Srilakshmi K Kumar

(57) ABSTRACT

An integrated enclosure/touch screen assembly. A touch screen assembly consisting of a display mechanism and optical sensor mechanism are enclosed within a single piece cover. The optical sensor mechanism consists of lens structure and optical sensor couple to the lens structure. The single piece cover includes a transparent top surface and the lens structure is embedded within the transparent top surface. The transparent top surface of the single piece cover provides an enclosure that is both dust free and waterproof.

The lens structure of the single piece cover functions by columnating light across the transparent surface. The optical touch sensor is coupled to the lens structure to register contact with the transparent surface via the lens structure by detecting disturbances in the columnated light. In one embodiment, the single piece cover is constructed by embedding the lens structure directly into the transparent surface. This process forms the single piece cover and also may be used to provide various shapes for the outer edges of the cover. The single piece cover eliminates exposed seams of the touch screen assembly. Additionally, the transparent surface is disposed directly above the display without any intervening layers, thereby improving the transmission of light to the display.

20 Claims, 5 Drawing Sheets

U.S. PATENT DOCUMENTS

| | | | |
|---|---|---|---|
| 5,995,084 A | 11/1999 | Chan et al. | |
| 6,017,584 A | 1/2000 | Albert et al. | |
| D425,036 S | 5/2000 | Copus et al. | |
| 6,057,814 A | 5/2000 | Kalt | |
| 6,067,074 A | 5/2000 | Lueders | |
| 6,068,381 A | 5/2000 | Ayres | |
| 6,069,593 A | 5/2000 | Lebby et al. | |
| 6,108,195 A | 8/2000 | Behl et al. | |
| 6,118,426 A | 9/2000 | Albert et al. | |
| 6,144,358 A | 11/2000 | Narayanaswamy et al. | |
| 6,163,313 A | 12/2000 | Aroyan et al. | |
| 6,181,842 B1 * | 1/2001 | Francis et al. | 385/14 |
| 6,191,833 B1 | 2/2001 | Hirakata | |
| 6,210,771 B1 | 4/2001 | Post et al. | |
| 6,215,476 B1 | 4/2001 | Depew et al. | |
| 6,229,502 B1 | 5/2001 | Schwab | |
| 6,252,564 B1 | 6/2001 | Albert et al. | |
| 6,256,009 B1 | 7/2001 | Lui et al. | |
| 6,262,717 B1 | 7/2001 | Donohue et al. | |
| 6,266,473 B1 | 7/2001 | Saccomanno et al. | |
| 6,295,403 B1 | 9/2001 | Takeuchi et al. | |
| 6,297,945 B1 | 10/2001 | Yamamoto | |
| 6,304,763 B1 | 10/2001 | Jahagirdar et al. | |
| 6,309,081 B1 | 10/2001 | Furihata | |
| 6,311,076 B1 | 10/2001 | Peuhu et al. | |
| 6,326,613 B1 | 12/2001 | Heslin et al. | |
| 6,327,482 B1 | 12/2001 | Miyashita | |
| 6,330,386 B1 | 12/2001 | Wagner et al. | |
| 6,333,736 B1 | 12/2001 | Sandbach | |
| 6,340,957 B1 | 1/2002 | Adler et al. | |
| 6,341,872 B1 | 1/2002 | Goto | |
| 6,343,006 B1 | 1/2002 | Moscovitch et al. | |
| 6,343,519 B1 | 2/2002 | Callicott et al. | |
| 6,347,873 B1 | 2/2002 | Hosseini et al. | |
| 6,352,350 B1 | 3/2002 | Ma | |
| 6,367,934 B1 | 4/2002 | Salesky et al. | |
| 6,377,228 B1 | 4/2002 | Jenkin et al. | |
| 6,377,324 B1 | 4/2002 | Katsura | |
| 6,392,786 B1 | 5/2002 | Albert | |
| 6,400,376 B1 | 6/2002 | Singh et al. | |
| 6,415,138 B2 | 7/2002 | Sirola et al. | |
| 6,424,403 B1 | 7/2002 | Leenhouts et al. | |
| 6,437,900 B1 | 8/2002 | Cornelissen et al. | |
| 6,456,279 B1 | 9/2002 | Kubo et al. | |
| 6,466,202 B1 | 10/2002 | Suso et al. | |
| 6,466,292 B1 | 10/2002 | Kim | |
| 6,483,498 B1 | 11/2002 | Colgan et al. | |
| 6,485,157 B2 | 11/2002 | Ohkawa | |
| 6,492,979 B1 | 12/2002 | Kent et al. | |
| 6,536,909 B1 | 3/2003 | Azorin | |
| 6,556,189 B1 | 4/2003 | Takahata et al. | |
| 6,565,189 B2 | 5/2003 | Yamada et al. | |
| 6,576,887 B2 | 6/2003 | Whitney et al. | |
| 6,577,496 B1 | 6/2003 | Gioscia et al. | |
| 6,601,961 B1 | 8/2003 | Masaki | |
| 6,607,297 B2 | 8/2003 | Egawa | |
| 6,630,928 B1 | 10/2003 | McIntyre et al. | |
| 6,662,244 B1 | 12/2003 | Takahashi | |
| 6,697,135 B1 | 2/2004 | Baek et al. | |
| 6,700,557 B1 | 3/2004 | McKnight | |
| 6,865,076 B2 * | 3/2005 | Lunsford | 361/679.56 |
| 6,950,087 B2 | 9/2005 | Knox et al. | |
| 6,955,198 B2 | 10/2005 | Wodjenski | |
| 6,965,375 B1 | 11/2005 | Gettemy et al. | |
| 6,992,659 B2 * | 1/2006 | Gettemy | 345/173 |
| 7,046,282 B1 | 5/2006 | Zhang et al. | |
| 2002/0021258 A1 | 2/2002 | Koenig | |
| 2002/0021622 A1 | 2/2002 | Baroche | |
| 2002/0149571 A1 | 10/2002 | Roberts | |
| 2003/0114200 A1 | 6/2003 | Lee | |
| 2004/0165060 A1 | 8/2004 | McNelley et al. | |

FOREIGN PATENT DOCUMENTS

| | | |
|---|---|---|
| EP | 898223 | 2/1999 |
| JP | 2003-84142 | 10/2004 |
| WO | 00/59179 | 10/2000 |
| WO | 00/79372 | 12/2000 |
| WO | 01/53919 | 7/2001 |

* cited by examiner

HIGH TRANSPARENCY INTEGRATED ENCLOSURE TOUCH SCREEN ASSEMBLY FOR A PORTABLE HAND HELD DEVICE

This patent application is a Continuation of commonly owned patent application Ser. No. 09/863,788, filed on May 22, 2001, now U.S. Pat. No. 6,992,659, entitled "A HIGH TRANSPARENCY INTEGRATED ENCLOSURE TOUCH SCREEN ASSEMBLY FOR A PORTABLE HAND HELD DEVICE", by Shawn Gettemy, which is incorporated herein by reference.

TECHNICAL FIELD

The present invention relates to a system for implementing a touch screen display for a personal information device ("PID"). In particular, the present invention relates to a system and method for implementing a reliable touch screen display system having increased light transmissivness resistant to environmental contamination.

BACKGROUND ART

Personal Information Devices include the class of computers, personal digital assistants and electronic organizers that tend both to be physically smaller than conventional computers and to have more limited hardware and data processing capabilities. PIDs include, for example, products sold by Palm, Inc. of Santa Clara, Calif., under such trademark as Pilot, and Pilot 1000, Pilot 5000, PalmPilot, PalmPilot Personal, PalmPilot Professional, Palm, and Palm III, Palm V, Palm VII, as well as other products sold under such trade names as WorkPad, Franklin Quest, and Franklin Convey.

PIDs are generally discussed, for example, in U. S. Patent Nos. 5,125,0398; 5,727,202; 5,832,489; 5,884,323; 5,889,888; 5,900,875; 6,000,000; 6,006,274; and 6,034,686, which are incorporated herein by reference. PIDs typically include a screen and data processor, allowing the PID user to operate a substantial variety of applications relating to, for example: electronic mail, a calendar, appointments, contact data (such as address and telephone numbers), notebook records, a calendar, expense reports, :to do lists: or games. PIDs also often include substantial electronic memory for storing such applications as well as data entered by the user. Due to their substantial variety of applications and uses, personal information devices are becoming increasingly widely used.

One important characteristic of personal information devices is the easy manner in which software applications and information are made available to the user. Many PIDs are equipped with touch screen displays. The touch screen displays are used to implement various user input and output schemes. Since PIDs and other similar palmtop computer systems are very small, keyboards are generally not efficient input devices. For example, PIDs with keyboards have keyboards that are so small that a user cannot touch-type. Furthermore, to use a keyboard a user must either place the PID system down onto a flat surface so the user can type with both hands or hold the PID system with two hands and type with thumbs only.

Thus, instead of using a keyboard, many PIDs employ a stylus and a touch screen or digitizer pad as an input system. The stylus and touchscreen combination works well for PIDs since the arrangement allows a user to hold the PID system in one hand while writing with the stylus onto the touchscreen with the other hand.

There is a problem, however, in that the mechanism for implementing the touch screen functionality tends to interfere with the transmission of light to an underlying display. Typical prior art touch screen displays employ a touch sensor mechanism overlaid on top of a display screen. The touch sensor mechanism detects user touches of its area, and translates such touches into appropriate inputs, such as, for example, icon manipulations, text entry, menu selections, and the like. The touch sensor mechanism is designed to be transparent to allow viewing of the underlying display screen. Unfortunately, prior art touch sensor mechanisms are not perfectly transparent. Prior art touch sensor mechanisms often allow only 60 percent or less of the impinging light to pass through to the underlying display screen. This leads to very dim displays. To overcome this characteristic, some manufacturers employ back lighting or front lighting of the display to compensate for the light attenuation of the touchscreen mechanism. This leads to excessive power consumption, decreased battery life, and overly large touch screen displays.

There exists an additional problem in that by combining a separate touchscreen mechanism and display screen to implement a touchscreen display, a seam necessarily exists between the mechanism and the screen. Although this seam can be sealed, it is still vulnerable to the entry of environment contaminants, such as dust, various liquids, etc. To improve the environmental seal, many manufacturers employ a beveled edge around the outsides of the touchscreen display, enclosing both the touchscreen mechanism and the display. Although the beveled edge improves the seal, environmental contaminants (e.g., dust, etc.) can still make their way around the edge and into the touchscreen display.

Thus, what is required is a solution that eliminates exposed seams of a PID. What is required is a solution which improves the transmission of light through the touchscreen mechanism, thereby improving the visibility of the display. The required solution should be inherently impervious to the entry of particulate contaminants and the like. The present invention provides a novel solution to the above requirements.

SUMMARY OF THE INVENTION

The present invention provides an integrated enclosure/touch screen assembly solution that eliminates exposed seams of a display of a hand-held electronic device. The present invention provides a solution which improves the transmission of light through the touchscreen mechanism, thereby improving the visibility of the display. The present invention is inherently impervious to the entry of particulate contaminants and the like.

In one embodiment, the present invention is implemented as an integrated enclosure/touch screen assembly for a PID. A touch screen assembly consisting of a display mechanism and optical sensor mechanism are enclosed within a single piece cover. The optical sensor mechanism consists of lens structure and optical sensor couple to the lens structure. The single piece cover includes a transparent top surface and the lens structure is embedded within the transparent top surface. The transparent top surface of the single piece cover is free of any steps or indentations which provides an enclosure that is both dust free and waterproof.

A soft thermoplastic material can be used for the single piece cover to allow activation of the optical sensor mechanism by means of mechanical contact applied to the transparent surface of the single piece cover. In one embodiment, the single piece cover is constructed by embedding the lens structure directly into the transparent surface. This process forms the flat outer surface for the single piece cover and also may be used to provide various shapes for the outer edges of the cover. The single piece cover eliminates exposed seams of the touch screen assembly. Additionally, the transparent surface is disposed directly above the display without any intervening layers, thereby improving the transmission of light to the display.

BRIEF DESCRIPTION OF THE DRAWINGS

The present invention is illustrated by way of example and not by way of limitation in the Figures of the accompanying drawings, in which like reference numerals refer to similar elements, and in which.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to obscure aspects of the present invention unnecessarily.

The present invention is directed towards an integrated enclosure/touch screen assembly solution that eliminates exposed seams of a display of a hand-held electronic device. The present invention provides a solution which improves the transmission of light through the touchscreen mechanism, thereby improving the visibility of the display. The present invention is inherently impervious to the entry of particulate contaminants and the like. The present invention and its benefits are further described below.

Figure 1:
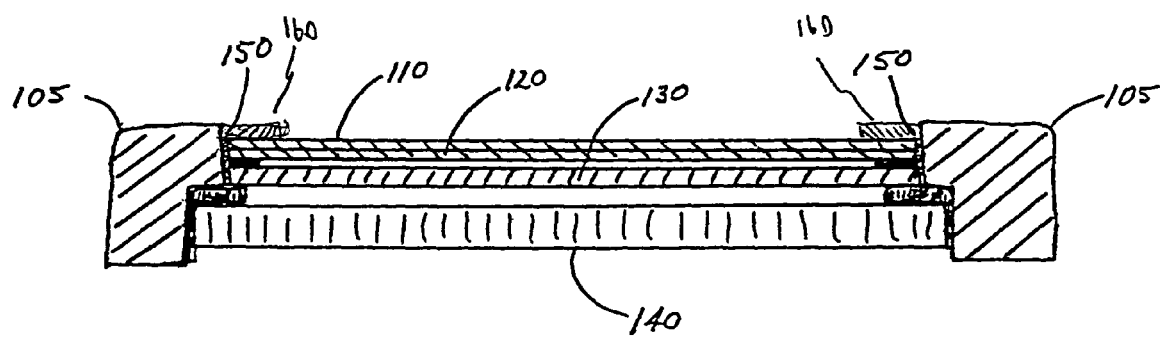
FIG. 1 is a cross-sectional view of enclosure/touch screen assembly having multiple layers and having exposed edge seals protected by a beveled edge as utilized in prior art.

FIG. 1 is a cross-sectional view of an enclosure/touch screen assembly 100 utilized in prior art. The entire assembly is held in place by the supporting structure 105. The outermost protective film, or hard coat, 110 provides mechanical protection for the digitizer film 120. In addition, the outermost protective film is coupled to the support mechanism in order to provide a moisture and dust seal. The digitizing element 130 is located below and close to the digitizer film. An externally applied pressure that deflects the protective film will also deflect the digitizer film Any applied pressure great enough to cause the digitizer film to contact the digitizing element will then activate the digitizer mechanism. The display element 140 is located below the digitizer mechanism. User information is displayed on the upper surface of the display element. Together, the protective film, the digitizer film and the digitizing element must have an opacity small enough to allow viewing of the information displayed on the display element. The entire touch screen assembly is located within the support structure such that the surface of the outermost protective film is below the upper edge of the support structure. There is therefore a step-down corner 150 from the upper edge of the support structure to the surface of the outermost protective film and the resulting assembly exhibits a bezel like appearance. These step-down corners are dust and moisture collectors, are difficult to clean and frequently do not seal properly. Bevel edges 160 are provided to help seal the step down corners. However, even bevel edges 160 do not provide adequate protection.

Other types of touch screen assemblies employ integrated single piece covers, for example, soft thermoplastic polycarbonate material covers, to provide environmental seals against dust and moisture. Although such single piece covers are more effective at sealing out environmental contaminants, the many layers of material of the touch screen assembly (e.g., a protective single piece cover, digitizer film, digitizer element, etc.) tend to significantly decrease the amount of light that reaches the underlying display. Additional disclosure of integrated single piece covers can be found in, INTEGRATED ENCLOSURE/TOUCH SCREEN ASSEMBLY, U.S. patent application No. 09/774,990, by Slothower et al., filed Jan. 30, 2001.

Figure 2:
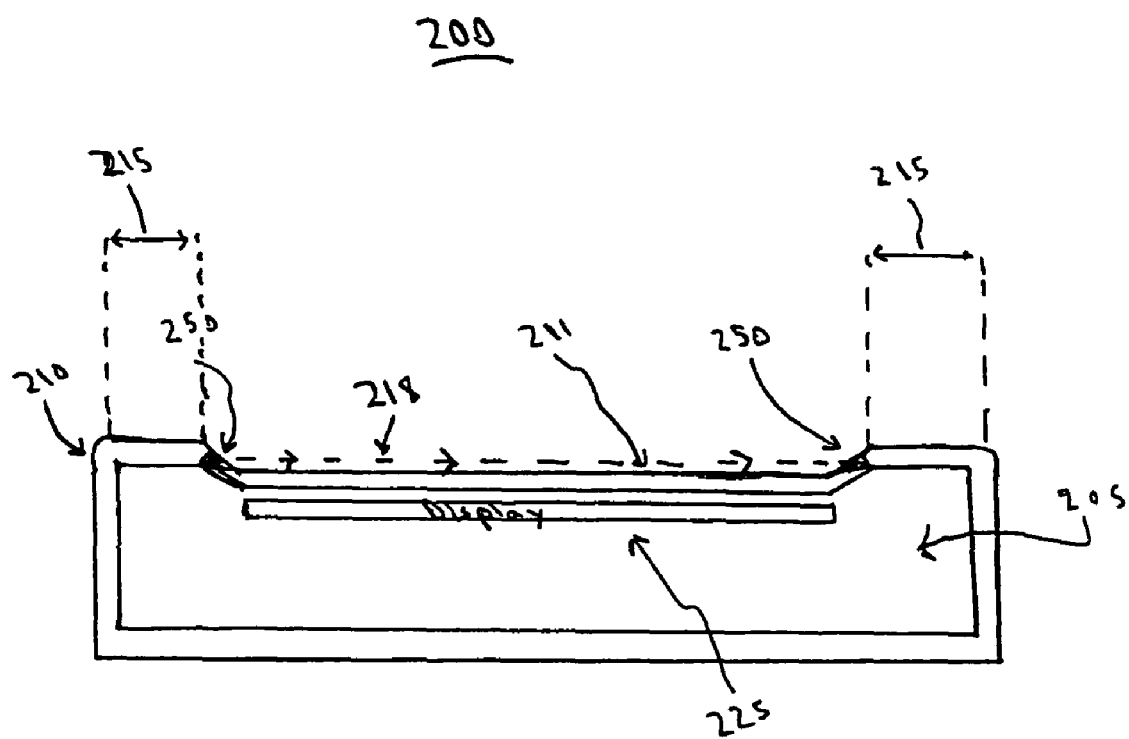
FIG. 2 shows a cross-sectional view of an embodiment in accordance with one embodiment of the present invention that does not have the exposed seals or the beveled edges as utilized in the prior art.

FIG. 2 shows a cross-sectional view of an embodiment 200 in accordance with one embodiment of the present invention, showing an integrated enclosure/touch screen assembly incorporating an optical lens structure for use with an optical sensor. In this embodiment, the single cover piece 210 incorporates an optical lens structure 250. In this embodiment, optical lens structure 250 columnates light transmitted parallel to surface of cover piece 210, as opposed to detecting pressure that deflects the surface, as in the embodiments described above. The light transmitted parallel to the surface of cover piece 210 is depicted as light beam 218 (e.g., dotted line 218). Contact with surface 210 interferes with light 218 transmitted between the optical lenses of lens structure 250, thereby allowing the accurate determination of the coordinates (e.g., x-y) of the contact (e.g., touch with a stylus or a finger).

A display 225 is disposed directly beneath cover piece 210. Cover piece 210 includes a transparent area 211 directly above the display. The transparent area 211, since it does not have to register contact, is optimized for its transparency. For example, transparent area 211 can be configured to transmit greater than 95 percent of the light impinging upon its surface to the underlying display 225. There are no intervening layers between area 211 and display 225. Accordingly, display 225 will have a much higher apparent brightness to a user since there are no intervening layers to further attenuate impinging light. A support structure 205 provides support for the cover piece 210 and display 225. An area 215 along the periphery of the transparent area 211 can be provided with in-mold decoration, for example, to distinguish the particular model of device 200, or the like.

Figure 3:
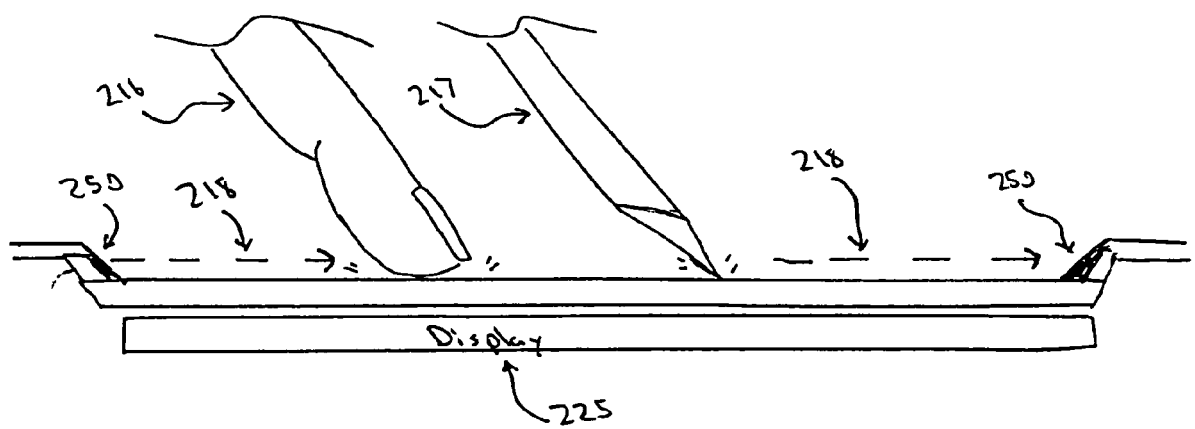
FIG. 3 shows a close up cross-sectional view of embodiment 200 in accordance with one embodiment of the present invention.

FIG. 3 shows a close up cross-sectional view of embodiment 200 in accordance with one embodiment of the present invention, a user's finger 216 or a stylus 217 in the process of actuating the touch screen. showing an integrated enclosure/touch screen assembly incorporating an optical lens structure for use with an optical sensor. As described above, optical lens structure 250 columnates light transmitted parallel to surface of cover piece 210. Light is transmitted parallel to the surface of cover piece 210 (e.g., dotted line 218). Contact with surface 210 interferes with light 218 transmitted between the optical lenses of lens structure 250, thereby allowing the accurate determination of the coordinates (e.g., x-y) of the contact with the finger 216 or the stylus 216.

Figure 4:
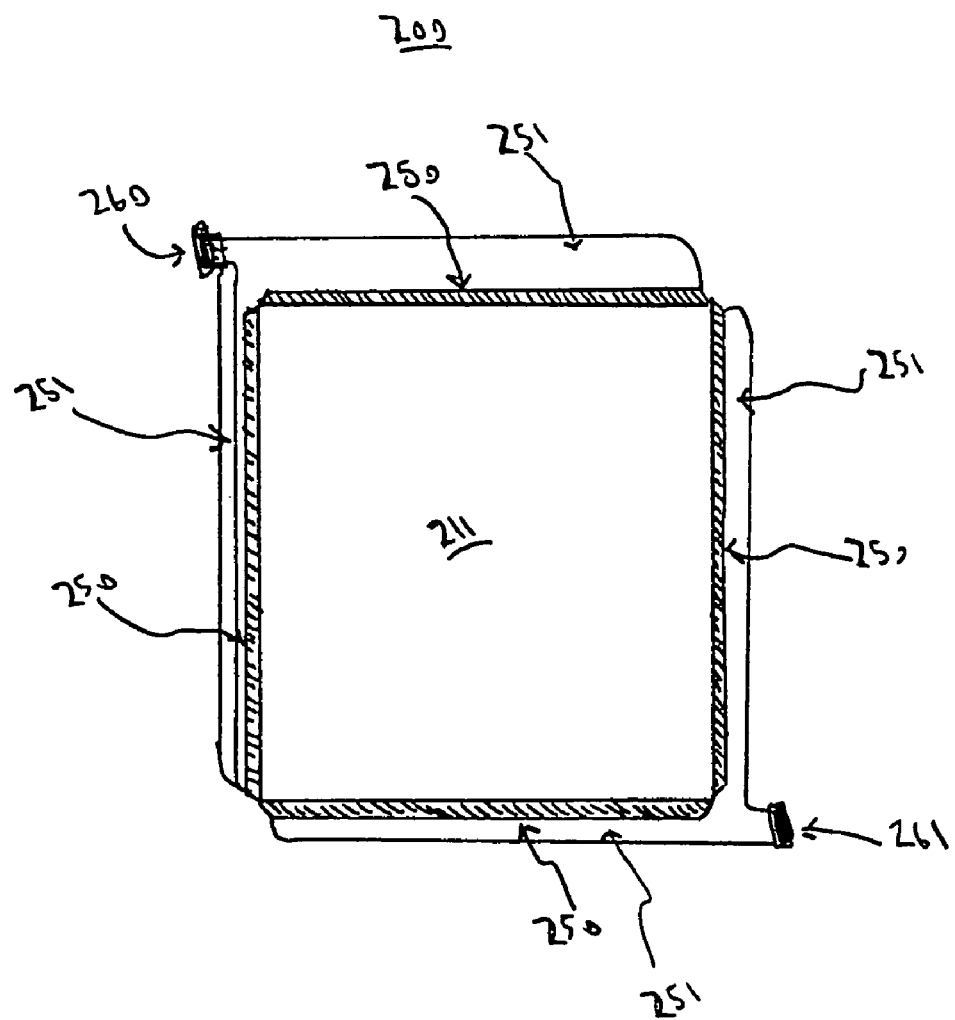
FIG. 4 shows a top-down view of the embodiment from FIG. 2 and FIG. 3 showing the transparent area, the optical lens structure, a light source, and an optical sensor according to an embodiment of the present invention.

FIG. 4 shows a top-down view of the embodiment 200 showing the transparent area 211, the optical lens structure 250, a light source 260, and an optical sensor 261. Light source 260 provides light to optical lenses of optical structure 250, which transmit light parallel to the surface of transparent area 211 to corresponding optical lenses on an opposite side of transparent area 211. Contact is detected when an object, such as, for example, a finger or a stylus, interferes with the light transmitted among the lenses of optical lens structure 250. Interferences with the light are detected by the coupled optical sensor 261. In this embodiment, a photodetector is used to implement optical sensor 261.

Figure 5:
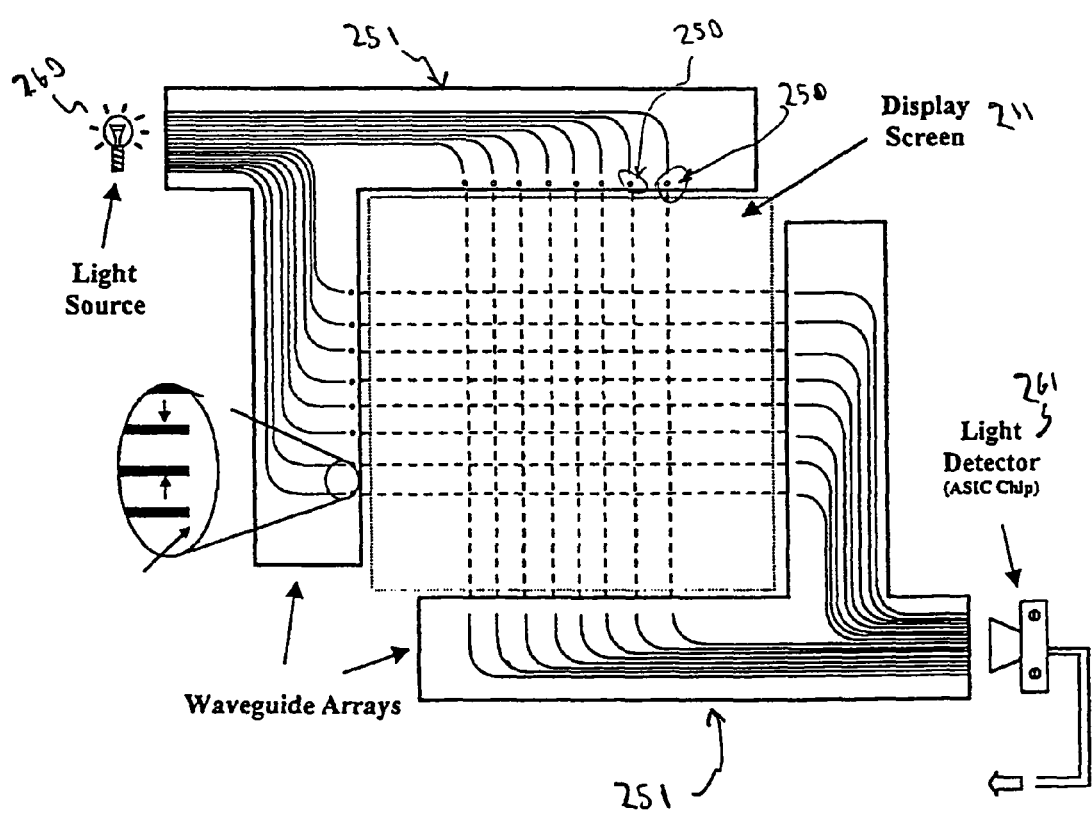
FIG. 5 shows a schematic top-down view of an optical sensor assembly, showing the lens structure in conjunction with the wave guides that couple the lens structure to the optical sensor, in accordance with one embodiment of the present invention.

FIG. 5 shows a schematic top-down view of an optical sensor assembly in accordance with one embodiment of the present invention. Optical lens structure 250 columnates light across the upper surface of cover piece 210 parallel to surface of cover piece 210, depicted as the horizontal and vertical dotted lines across transparent area 211 over the display. Contact with the surface of transparent area 211 creates a shadow and is thus detected by optical sensor/light detector 261. In this embodiment, the "grid" arrangement provided by optical lens structure 250 allows the accurate determination of the coordinates (e.g., x-y) of the contact (e.g., touch with a stylus or a finger). In this embodiment, optical lens structure 250 is embedded directly within cover piece 210, along the periphery of transparent area 211, thereby eliminating any seams through which contaminants might enter the assembly.

Thus, the present invention is directed towards an integrated enclosure/touch screen assembly solution that eliminates exposed seams of a display of a hand-held electronic device. The present invention provides a solution which improves the transmission of light through the touchscreen mechanism, thereby improving the visibility of the display. The present invention is inherently impervious to the entry of particulate contaminants and the like.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A portable electronic device comprising:
a display; and
a housing enclosing said display on at least four sides, wherein said housing further comprises:
a transparent top surface for viewing said display disposed directly above said display;
a light source;
a lens structure for transmitting light from said light source parallel to said transparent surface; and
an optical sensor operable to detect a portion of said light transmitted parallel to said transparent surface, and to detect a set of coordinates of an object located in proximity to said transparent surface based upon an interference with a portion of said light by said object, wherein said optical sensor is integrated into said housing;
wherein the light source, the lens structure and the optical sensor are enclosed within a single piece cover of the housing, the single piece cover including the transparent top surface, the lens structure embedded within the transparent top surface.

2. The portable electronic device of claim 1 further comprising:
a light source disposed within said housing, said light source operable to generate said light.

3. The portable electronic device of claim 1, wherein said object is selected from a group consisting of a stylus and a finger.

4. The portable electronic device of claim 1, wherein the transparent top surface of said single-piece cover is free of steps or indentations.

5. The portable electronic device of claim 1, wherein said lens structure is further operable to transmit said light across said transparent surface in a plurality of columns.

6. The portable electronic device of claim 5, wherein said plurality of columns comprise a first plurality of columns and a second plurality of columns, and wherein said first plurality of columns intersect said second plurality of columns.

7. The portable electronic device of claim 1, wherein said housing further comprises at least one waveguide for directing said light from a light source to said lens structure.

8. A portable electronic device comprising:
a housing comprising a transparent top surface and at least one lens structure, wherein said at least one lens structure is integrated into said housing;
a display device disposed within said housing directly below said transparent surface and viewable through said transparent surface;
a light source disposed within said housing and for generating light; and
an optical sensor integrated into said housing and for detecting an object in proximity to said transparent surface based upon interference with said light by said object, and for detecting a set of coordinates of said object based upon said interference;
wherein the light source, the at least one lens structure and the optical sensor are enclosed within a single piece cover of the housing, the single piece cover including the transparent top surface, the lens structure embedded within the transparent top surface.

9. The portable electronic device of claim 8, wherein said at least one lens structure comprises:
a first lens structure for interfacing with said light source; and
a second lens structure for interfacing with said optical sensor.

10. The portable electronic device of claim 9, wherein said housing further comprises:
a first waveguide for directing said light from said light source to said first lens structure; and
a second waveguide for directing a portion of said light from said second lens structure to said optical sensor.

11. The portable electronic device of claim 9, wherein said first lens structure is further operable to transmit said light across said transparent surface in a plurality of columns.

12. The portable electronic device of claim 11, wherein said plurality of columns comprise a first plurality of columns and a second plurality of columns, and wherein said first plurality of columns intersect said second plurality of columns.

13. The portable electronic device of claim 8, wherein said object is selected from a group consisting of a stylus and a finger.

14. The portable electronic device of claim 8, wherein the transparent top surface of said single-piece cover is free of steps or indentations.

15. A housing for a portable electronic device, said housing comprising:
   a single piece cover including a transparent top surface disposed directly above a display;
   a first integrated lens structure for interfacing with a light source, said first integrated lens structure further for directing light from said light source parallel to said transparent surface, said first integrated lens structure further for enabling interference between said light and an object located in proximity to said transparent surface; and
   a second integrated lens structure for interfacing with an optical sensor integrated into said housing, said second integrated lens structure further for receiving a portion of said light and for detecting a position of said object with respect to said transparent surface based upon said interference, and
   wherein the display, the light source and the optical sensor are enclosed within the single piece cover, and the first and second integrated lens structures are embedded within the transparent top surface.

16. The housing of claim 15, wherein said first integrated lens structure is further operable to transmit said light across said transparent surface in a plurality of columns.

17. The housing of claim 16, wherein said plurality of columns comprise a first plurality of columns and a second plurality of columns, and wherein said first plurality of columns intersect said second plurality of columns.

18. The housing of claim 15, wherein said object is selected from a group consisting of a stylus and a finger.

19. The housing of claim 15, wherein the transparent top surface of said single-piece cover is free of steps or indentations.

20. The housing of claim 15 further comprising:
   a first waveguide for directing said light from said light source to said first integrated lens structure; and
   a second waveguide for directing said portion of said light from said second integrated lens structure to said optical sensor.

* * * * *